United States Patent
Lee et al.

(10) Patent No.: US 6,480,849 B1
(45) Date of Patent: Nov. 12, 2002

(54) EFFICIENT CONCURRENCY CONTROL METHOD FOR HIGH DIMENSIONAL INDEX STRUCTURES

(75) Inventors: Jang Sun Lee, Taejon (KR); Young-Kee Song, Taejon (KR); Myung-Joon Kim, Taejon (KR); Jae Soo Yoo, Chungbook (KR); Seok Il Song, Chungbook (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/409,814

(22) Filed: Sep. 30, 1999

(30) Foreign Application Priority Data

Oct. 27, 1998 (KR) ............................................. 98-44943

(51) Int. Cl.$^7$ ............................................. G06F 17/30
(52) U.S. Cl. ............................................. 707/8; 707/203
(58) Field of Search .................. 707/200, 201, 707/202, 203, 204, 205, 206, 8; 717/108, 117

(56) References Cited

U.S. PATENT DOCUMENTS

| | | | | |
|---|---|---|---|---|
| 4,823,310 A | * | 4/1989 | Grand | 707/8 |
| 5,495,609 A | * | 2/1996 | Scott | 707/8 |
| 5,717,921 A | | 2/1998 | Lomet et al. | 395/611 |
| 5,758,356 A | | 5/1998 | Hara et al. | 707/202 |
| 6,073,129 A | * | 6/2000 | Levine et al. | 707/4 |
| 6,249,788 B1 | * | 6/2001 | Ronstrom | 707/101 |

OTHER PUBLICATIONS

Lehman and Yao, "Efficient Locking for Concurrent Operations on B–Trees," *ACM Transactions on Database Systems*, 6(4):650–670, Dec. 1981.

Kornacker and Banks, "High–Concurrency Locking in R–Trees," *Proceedings of the 21st VLDB Conference*, Zürich, Switzerland, pp. 134–145, 1995.

Chen et al., "A Study of Concurrent Operations on R–Trees," *Information Sciences*, 98:263–300, 1997.

* cited by examiner

*Primary Examiner*—Safet Metjahic
*Assistant Examiner*—Haythim J. Alaubaidi
(74) *Attorney, Agent, or Firm*—Seed Intellectual Property Law Group PLLC

(57) ABSTRACT

A concurrency control method for a high dimensional index structure that provides efficient concurrency control method for a high dimensional index structure, which performs reinsertion of certain objects to cope with node overflow. The concurrency controlled searching method includes the following steps. First, an entry is obtained from a queue storing the root node and an object relating to the entry is selected. Second, whether a logic sequence number (LSN) of a lower level node is larger than an expected LSN stored in the upper node is determined. Third, the process moves to a neighbor node of the lower level node if the LSN is bigger than an expected LSN stored in the upper node in the second step, selects a relating object, and performs from the second step repeatedly. Fourth, an object of a node of a level corresponding to the lower level node in a reinsertion table is selected when a search on an index tree is finished if the LSN is not bigger than the expected LSN stored in the upper node in the second step.

8 Claims, 12 Drawing Sheets

REFLECTION OF MBR TO THE SAME NODE

REFLECTION OF MBR TO DIFFERENT NODES

EFFICIENT CONCURRENCY CONTROL METHOD FOR HIGH DIMENSIONAL INDEX STRUCTURES

FIELD OF THE INVENTION

The present invention relates to an efficient concurrency control method for a high dimensional index structure that employs a time stamp sequence method during insertion, deletion, and searching objects to avoid possible conflicts caused by lock-coupling and to provide efficient ways to search objects being reinserted by introducing a reinsertion table.

BACKGROUND OF THE INVENTION

Most index structures are formed in a tree shape, which is why the index structure is called the index tree. Each element of an index tree is called a node. The nodes constitute an index tree that is constructed by performing insertion and deletion operations. An entry object is inserted into the node of the tree in accordance with predetermined rules.

For each node of the index tree, a finite number of objects can be inserted. If the number of objects exceeds this predetermined number, this condition is called an overflow. When an overflow occurs, some entries in the node where overflow occurred are selected and then the selected entries are reinserted into the index tree one by one for performance improvement.

Previous studies of currency control methods for convenient index structures are mainly focused on a B-tree structure in which only one-dimensional data is used. Recently, concurrency control methods for an R-tree structure has been started. In an R-tree structure, an index tree for managing a multi-dimensional data is used. In these studies, the concurrency control method with the link technique shows better performance when compared with the concurrency control method with the lock-coupling technique.

However, it is difficult to directly apply a conventional link technique to a high dimensional index structure because of the structural difference and the difference in an insertion and division method.

The background knowledge that is helpful to understand the present invention is explained as follows.

First, a $B^{LINK}$-tree is an index structure that achieves the serializability by adding a concurrency control technique to the conventional B-tree scheme. One of the conventional concurrency control techniques is the lock-coupling technique, in which a lock on the parent node is to be maintained until a lock on a child node is obtained for consistency of a tree structure.

In other words, this technique employs a top-down lock-coupling scheme. In the top-down lock-coupling scheme, a lock on the parent node can only be released after a lock on a child node is granted. The main drawback of this method is that locks are to be held during I/O operations, deletion operations, and splitting operations.

In order to avoid conflicts possibly caused by the locking-coupling technique, the conventional B-tree structure is slightly modified: a 'rightlink' is added. Except for the rightmost node, the rightlink is a pointer going from every node to its right sibling on the same level of the tree. When a node is split in an index tree, a new right sibling is created. At this moment the rightlink of the old node is copied to the newly created node and then the rightlink of the old node is changed to point the new right sibling node. This means that all nodes at the same level are chained together through rightlinks.

Like the conventional B-tree, the $B^{LINK}$-tree is sorted by a key value, that is, a maximum key value. A maximum key value is located in the rightmost position of each level of the index tree. In addition, it is possible to move to the rightward direction through the rightlink pointer. It is possible to freely search the index tree without using the lock-coupling technique in the $B^{LINK}$-tree.

Let's suppose that one search process checks the parent node. If a node-splitting operation performed on a child node before this search process reaches child node, the split operation is not yet known to the parent node. To avoid this error, the search process compares the key value of its own with maximum key value of child node.

If the key value of the search process is bigger than a maximum key value of the child node, the search process assumes that node splitting has occurred in the child node and moves to the next rightward node and compares the key value of the search process with the maximum key value of the node. Until the key value of the search process is smaller than or equal to the maximum key value of the node, this operation is performed repeatedly. If a node that has a desired key value is searched, then the search process continues searching to its child node.

The Insertion process can also use the same operation to locate a terminal node in order to add new records.

Since this operation doesn't use lock-coupling technique for the insertion process and search process, lock conflicts can be efficiently avoided. In addition, the deadlock is not to be allowed.

The $R^{LINK}$-tree is an index tree structure that is capable of providing an effective concurrency control like the $B^{LINK}$-tree. By introducing the concurrency control technique of the $B^{LINK}$-tree to the conventional R-tree, the $R^{LINK}$-tree scheme was developed.

Unlike the B-tree, nodes of the R-tree are not sorted by the key value. It is problematic to apply the technique of the $B^{LINK}$-tree directly to R-tree. In the $B^{LINK}$-tree, key values are simply compared, and therefore it is possible to determine whether the lower level nodes have been split and when the rightlink search is to be finished. However, In R-tree, this operation is not feasible.

In order to apply the link technique used for the $B^{LINK}$-tree, a LSN (Logical Sequence Number) is introduced. By manipulating LSN, it is possible to determine whether lower level nodes have been split and when the rightlink search is to be finished.

The LSN is a value that increases as time passes.

The structure of the conventional R-tree, the structure of the node, and objects in the node have been modified by the introduction of LSN. The search and insertion algorithms have been modified as well.

In the structure of the $R^{LINK}$-tree in which LSN is employed, all nodes of the same level form a chain structure connected through rightlinks. The LSN that is the only value in the index structure is added to each node. An object of each node includes MBR (Minimum Bounding Region) of the node, a pointer pointing child node, and an expected LSN that the child node might have. In a high dimensional index structure, each object included in a node is represented as an N dimensional space vector, and the minimum region that is able to hold all objects of the node is called the MBR (Minimum Bounding Region). In addition, a pointer pointing to its rightward sibling node is added to the node. In the present invention, it is assumed that nodes in the CIR-tree node have all the elements described above.

When a node is split, the LSN of the split node is allocated to the newly generated node and a new LSN is allocated to the split node. When an index tree is being searched by a search process, it is possible to determine whether the child node has been split using LSN. That is, it is possible to determine whether the node is split by comparing the LSN of the child node with the expected LSN of the object of the upper node.

If the LSN of the child node is bigger than the expected LSN of the object of the upper node, the node has been split. Then the search is performed in the rightward direction through the rightlink until finding a node whose LSN is the same as the expected LSN of the object of the upper node.

Like this, the high concurrency control method of the $B^{LINK}$-tree may be applied to the R-tree structure.

However, it is very difficult to avoid the lock-coupling in the $R^{LINK}$-tree. When an operation that changes the structure of the tree is performed, the lock-coupling should be performed to maintain consistency of the tree due to the structural characteristic of the R-tree group.

SUMMARY OF THE INVENTION

The present invention provides an efficient concurrency control method for a high dimensional index structure that overcomes the problems encountered in conventional index structures.

Moreover, the present invention provides an efficient concurrency control method for a high dimensional index structure that avoids possible conflicts caused by lock-coupling by employing the time stamp sequence method during insertion, deletion, and searching objects. It is also possible to search objects being reinserted by employing a reinsertion table.

In order to achieve the objectives mentioned above, a search method is provided. The data structure to support this method is the queue, which is to remember which nodes still need to be examined. This method starts by initially inserting the root on the queue. A node that has not yet been examined is deleted from the queue and all entries in the node that qualify for the search condition are inserted to the queue and the whole process is repeated. In each level of the tree the reinsertion table is also examined and all entries in the table that qualify for the search condition are also inserted to the queue, which guarantees the entries that are being inserted can be searched. The search is terminated when the queue is empty.

In order to achieve the foregoing, an insertion method is provided. An insertion process is composed of three procedures. First, the leaf node should be located to insert a new entry to the node, and it is examined to determine whether the entry can be inserted to the node or not. Second, the new entry is inserted and MBR (Minimum Bounding Region) is adjusted if it is possible to insert the new entry to the node. Third, if it is not possible to insert the new entry to the node, which means the node is full, and the node should be split or some entries of the node should be reinserted.

In order to achieve the foregoing, a deletion method is provided. A deletion method is composed of two procedures: first, the leaf node to delete an entry must be located; and second, the MBR is adjusted.

A media that stores the programs for a search operation is also provided. The program runs the following procedures.

The underlying data structure to support a search operation is a queue, which is used to remember which nodes still have to be examined. A search starts by initially inserting the root on the queue. A node that has not yet been examined is deleted from the queue and all entries in the node that qualify for the search condition are inserted to the queue and the whole process is repeated. In each level of the tree the reinsertion table is also examined and all entries in the table that qualify for the search condition are also inserted to the queue, which guarantees the entries that are being reinserted can be searched. The search is terminated when the queue is empty.

A media that stores the programs for an insertion method is also provided. The program runs the following procedures. First, the leaf node is located to insert a new entry to the node, and it is examined to determine whether the entry can be inserted to the node or not. Second, the new entry is inserted and the MBR (Minimum Bounding Region) is adjusted if it is possible to insert the new entry to the node. Third, if it is not possible to insert the new entry to the node, which means the node is full, the node is split or some entries of the node are reinserted.

In order to achieve the objectives mentioned above, a media that stores the programs for a deletion is provided. A deletion proceeds in two procedures: first the leaf node to delete an entry must be located; and second, the MBR is adjusted.

BRIEF DESCRIPTION OF THE DRAWINGS

The embodiments of the present invention will be explained with reference to the accompanying drawings.

DETAILED DESCRIPTION OF THE PREFERRED EMBODIMENTS

Figure 1:
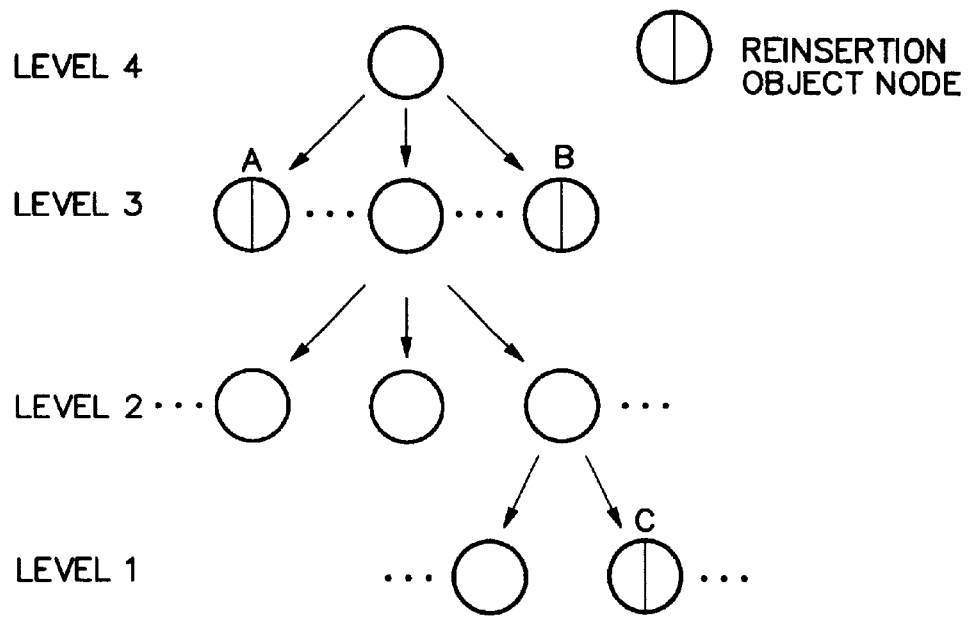
FIG. 1 is a view illustrating the construction of a reinsertion table according to the present invention.

In order to improve the performance of an index tree, high dimensional index structures, such as R*-tree, SS-tree, TV-tree, X-tree, and CIR-tree, reinsert some entries of the node if an entry is tried to be inserted to the full node. At this time, the selected entries for the reinsertion are actually deleted from the index tree. Therefore, it is very difficult to search the entries that are being reinserted. Generally, the reinsertion process takes so long that it may cause serious search errors.

The present invention provides an effective concurrency control method in a high dimensional index structure. During the reinsertion operation, the deleted entries are stored in a reinsertion table. Therefore, it is possible to search the entries being reinserted by searching the reinsertion table.

In the disclosed embodiments, a link technique of the $R^{LINK}$-tree is employed. The $R^{LINK}$-tree employs the link technique in order to avoid the degradation of the concurrency, which results from the lock-coupling method. However, in the $R^{LINK}$-tree, it is very difficult to avoid the lock-coupling problems completely. When an operation is performed to modify the structure of the tree, the lock-coupling is to be performed to keep the consistency of the tree because of the structural characteristics of the R-tree group. In other words, in the $R^{LINK}$-tree, the lock-coupling is used to maintain the consistency of the tree when the upper node access sequence is not matched with the occurrence sequence of a corresponding transaction or process (in the present invention, the terminology "process" and "transaction" may substitute each other).

In the disclosed embodiments, the lock-coupling is not to be performed because it provides a way to determine the execution sequence among transactions with the help of the time stamp sequence method.

The embodiments of the present invention will be explained by applying the concurrency control method to the CIR-tree. For reference, the concurrency control algorithm may be implemented by slight modification of the structures of R*-tree, SS-tree, TV-tree, and X-tree.

Now, the concurrency control method in which the search may be implemented for a reinserted object during the reinsertion process is to be explained.

In the high dimensional index structure including the CIR-tree, the reinsertion operation controls the balance of the tree as well as enhances the search efficiency by clustering entries into the node. However, the information concerning the selected objects should be deleted from the index tree during the reinsertion operation. In other search operations, it is almost impossible to search the entries being reinserted and therefore the accurate search operation is not guaranteed.

In the disclosed embodiments, it is possible to perform an accurate search operation during the reinsertion operation. For this reason, a reinsertion table is used. The reinsertion table is stored in shared memory so that other processes can share the access to the reinsertion table.

FIG. 1 is a view for illustrating the construction of a reinsertion table according to the present invention;

Table 1 shows a reinsertion table. In table 1, the nodes that contain the entries to be inserted at level 3 are A and B. C is the node at level 1.

TABLE 1

| Level | Entry | Entry |
| --- | --- | --- |
| 4 | | |
| 3 | (MBR, TB) | (MBR, TA) |

TABLE 1-continued

| Level | Entry | Entry |
| --- | --- | --- |
| 2 | | |
| 1 | (MBR, TC) | |

As shown in Table 1, the entries deleted for reinsertion for node A is stored into a temporary node TA. In addition, the entries deleted for reinsertion at node B are stored into a temporary node TB. The entries deleted for reinsertion at the node C are stored into a temporary node TC.

The reinsertion process is performed as follows:

First, 40% of the entries of the node are selected in a manner suggested by the CIR-tree. The MBR of the entries remaining in the node is computed and is adjusted for the upper node. In high dimensional index structure, each object included in a node is represented as N dimensional space vector and the minimum region that is able to hold all objects of the node is called MBR.

In order to reinsert the selected entries, a temporary node is allocated; the entries are stored in the node. The MBR of the entries contained in the temporary node is computed. The computed MBR and the temporary node are recorded into the reinsertion table as an entry. At this time, the entry is recorded into the reinsertion table by the level of the index tree.

The entries are moved from the temporary nodes one by one and then are inserted into the index tree by the insertion operation. During this process, the entries that are successfully inserted are not to be deleted from the temporary nodes by the reason that if these entries are deleted it would be impossible to search them. Therefore, all entries in the temporary nodes are not to be deleted until a reinsertion operation is finished. When all entries are inserted, the time to delete the entry from the reinsertion table should be determined. If the time for deletion is determined and then the entry is deleted from the reinsertion table, the reinsertion operation is finished.

The time for deletion from the reinsertion table is determined based on the search operations that are performed concurrently.

Figure 2:
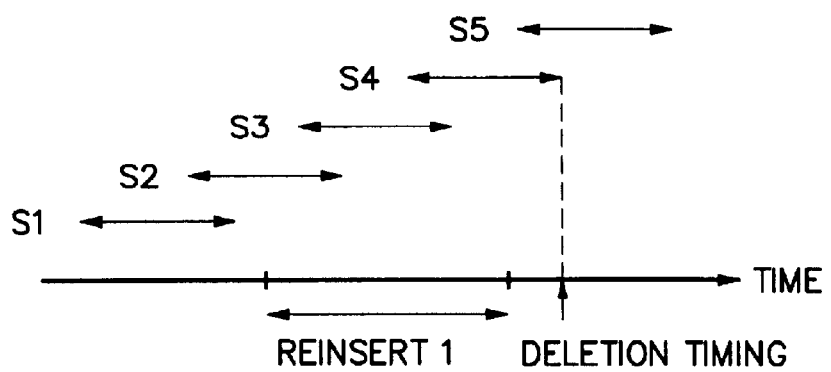
FIG. 2 is a view illustrating the timing for deleting an entry of a reinsertion table according to the present invention.

FIG. 2 illustrates the timing for deleting an entry from the reinsertion table according to the present invention.

In the figure, S1, S2, ... S5 represent search operations. These search operations and a reinsertion operation, ReInsert1, can be performed concurrently. As shown in the figure, S1 is finished before ReInsert1 gets started, S2 started before ReInsert1, and S2 is finished before ReInsert1 is finished.

S3 is started and finished during the reinsertion operation ReInsert1. S4 starts before ReInsert1 is finished, and S4 is finished after the ReInsert1 is finished. Finally, S5 is started after ReInsert1 is finished. Note that the search operations using the entry stored in the reinsertion table are S2, S3, and S4. Therefore, the timing to delete the entry from the reinsertion table will be when S4 is finished. As described above, the time for deletion of an entry from the reinsertion table is when the search operation among the previously started search operation or started during a reinsertion operation being performed is finished lastly.

The concurrency control method for high dimensional index structures will be explained in detail.

When performing an operation in which the structure of the tree is modified in the $R^{LINK}$-tree, the lock-coupling is applied to keep the consistency of the tree. In other words, if a process performs a modification on a node that requires a modification of the structure of the tree, then the modification should be applied to the upper node prior to the other process that performs an operation on the same node later. Otherwise the consistency of the tree cannot be kept. In order to overcome these problems, in the present invention, the sequence of the transactions is determined based on the time stamp sequence method.

Figure 3A:
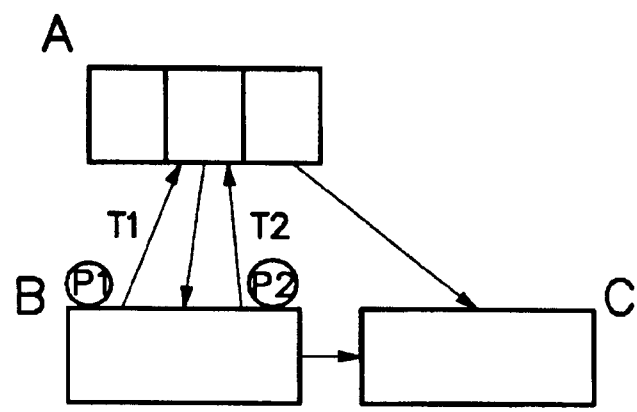
FIGS. 3A through 3C are views illustrating a concurrency control method for a high dimensional index structure using a time stamp according to the present invention.
Figure 3B:
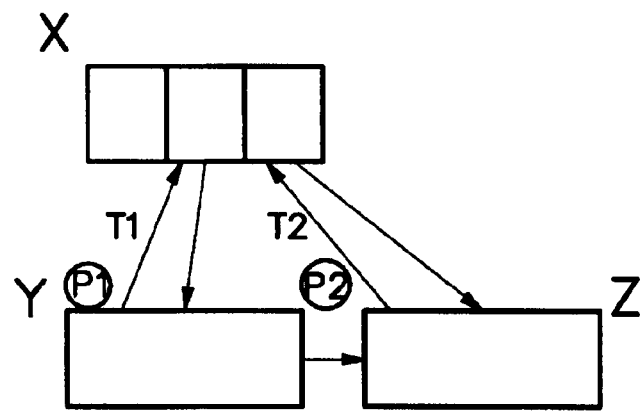
Figure 3C:
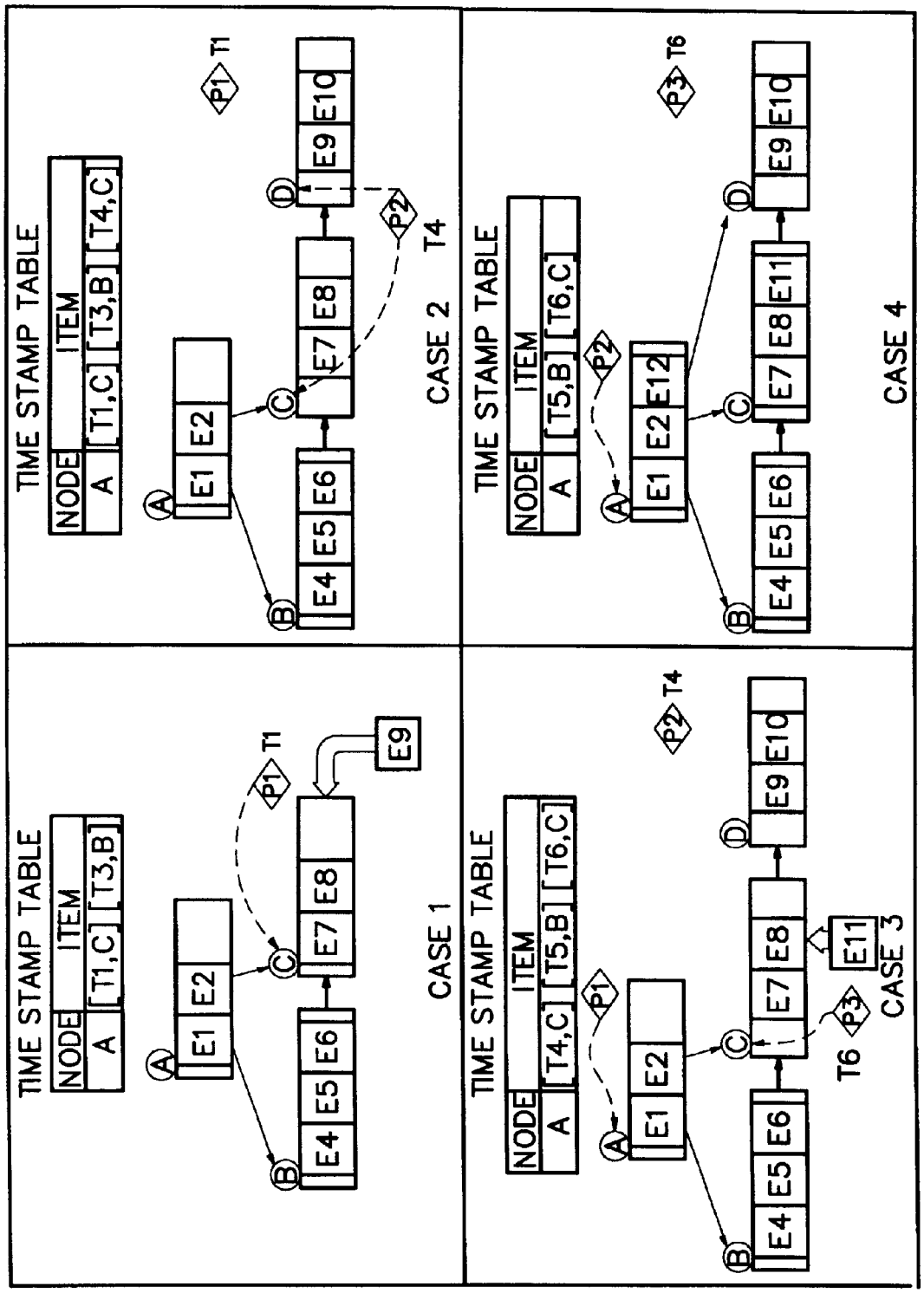

FIGS. 3A through 3C illustrate a concurrency control method for a high dimensional index structure using a time stamp in accordance with the present invention.

A time stamp is allocated to a transaction when MBR information is modified by the transaction and then the modification should be reflected to the upper node or a node is split. At this time, the time stamp value is allocated to each transaction to determine an access sequence of the node.

FIG. 3A illustrates an example that the modified MBR is reflected to the upper node when the MBR is modified by two processes, P1 and P2, that perform an insertion operation to a node that is accessed through the same entry in the same node.

As shown in the figure, the operations performed by process P1 and process P2 need to change MBR; process P1 is performed earlier than process P2. To reflect the change to the upper node, [B, T1] and [B, T2] are stored in the time stamp table of node A; the lock on node B is released at this moment.

If transactions waiting for obtaining a lock for the upper node are from the same node, the transaction which is trying to store a time stamp to the table of the node compares the stamp values. If the time stamp value is smaller than the others, a lock on the node is requested and then the registered time stamp and the node identifier are removed from the table.

If the time stamp value is bigger than the others, it waits for a certain period of time and then retries to obtain a lock.

FIG. 3B illustrates an example that the modification of lower level nodes is reflected to the different entries of the upper node. In this case, process P1 and process P2 may be performed independently because process P1 and process P2 are identified using the node identifier in the time stamp table. Therefore, process P1 and process P2 check the time stamp table of node X to determine whether they can request a lock or not as shown in FIG. 3A.

As shown in FIG. 3C, the consistency of the tree can be maintained by employing the time stamp since the time stamp is used to serialize the transactions. The case 1 in FIG. 3C shows a situation, in which process P1 inserts an entry E9 into the node C and modifies MBR of the node. It then requests a time stamp T1 to reflect MBR to the upper node A. Finally, process P1 releases the lock on node C. This shows that the search operation that visited node A can normally search the entries of node C using the search algorithm.

As shown in FIG. 3C, the case 2 is the situation that after process P2 obtains write-lock on node C, an entry E10 is inserted, and the node is split, and then [T4,C] is registered into the time stamp table of the node A. Process P2 waits for the completion of process P1 since process P1 is registered as T1 prior to process P2.

In other words, because the process that has the smallest time stamp always performs an update operation on the same node with priority, the consistency of the tree is maintained. At this time, all entries in node C as well as all entries in the split nodes can be searched through the rightlink of node C.

The case 3 in FIG. 3C explains the case that the process P1 obtains write-lock on node A and reflects the modification of node C. Process P1 deletes the time stamp information from the time stamp table. Process P2 requests write-lock on node A for an update the node. In addition, the process P3 obtains write-lock on node C and inserts the object E11, and registers T6 for reflecting the modified content of MBR to the upper node. However it has to wait without requesting a write-lock on node A because [T4, C] is registered already.

In other words, when an update process for the same object on the node makes a modification and the upper node reflects the modification, time stamps are compared and consistency is maintained. In case 4, since a write-lock is being requested by process P3 on node A and it is not an update process for the same object, the consistency is maintained. As a result, the search operation is accurately performed in all cases in which a node update may occur.

Figure 4:
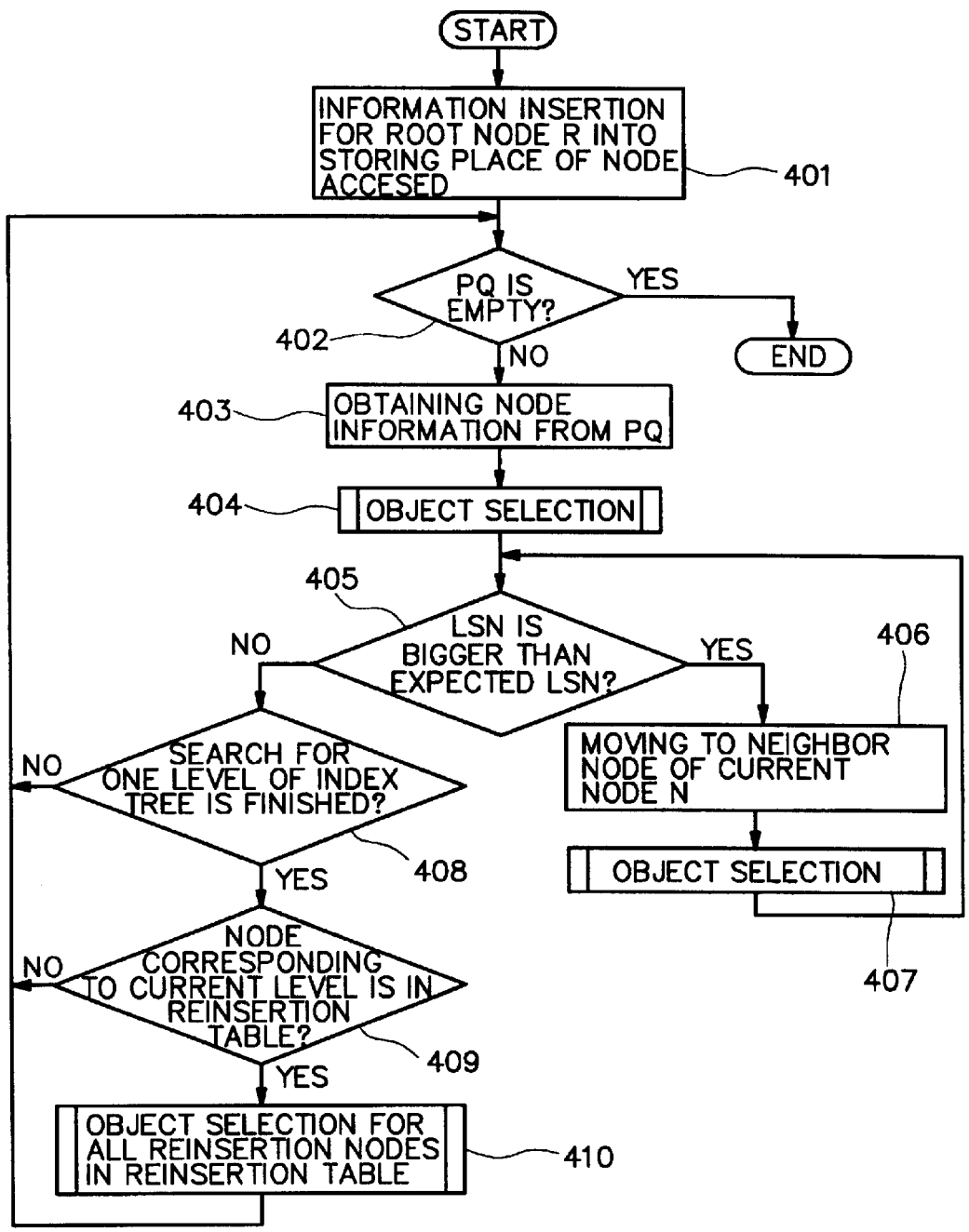
FIG. 4 is a flow chart illustrating a searching the entries to be reinserted according to the present invention.

FIG. 4 is a flow chart illustrating a searching of the entries to be reinserted according to the present invention.

A queue structure is used for the breadth first search. Here, the queue is defined as PQ (PathQueue). In addition, the terminology is defined as follows for efficient explanations of the breadth first search method.

InsertQ: a node information is inserted into the queue (pointer of the node, and the expected logical sequence number (LNS)).

DeleteQ: one entry is deleted from the queue and the entry is stored into a predetermined variable.

As shown in the Figure, by the search method in which the concurrency is controlled, the root node which is the reference for the search is inserted into the queue in Step 401, and it is checked whether the queue is empty in Step 402. If the queue is empty, search process ends. If the queue is not empty, one entry is obtained from the queue (DeleteQ) in Step 403. An object is selected in accordance with the obtained entry in Step 404. The object selection process is explained in FIG. 6 in detail.

The node may be split when an overflow occurs in high dimensional index tree. In other words, after the entry obtained from the queue is processed in accordance with previously described procedures, whether the node is split is to be checked and then appropriate operations are performed accordingly. At this time, the node is checked to be split by comparison between the logical sequence number (LSN) of the node and the predicted logical sequence number.

Namely, it is to be checked whether the expected logical sequence number is bigger than the logical sequence number of the node in Step 405. If the logical sequence number of the node is bigger than the expected logical sequence number, it means that search process is trying to access the node that is split but the modified content of the split node is not yet reflected on the upper node. At this time, as shown in Step 406, the search process is moving to the neighbor node through the rightlink chain until the logic sequence number of the node and the expected logical sequence number are same. After the object is selected in accordance with the satisfaction of query Q in Step 407, the checking process step to determine whether the expected logical sequence number is bigger than the logic sequence number is to be repeated from Step 405.

Based upon the result of the determination, if the logical sequence number of the node is smaller than the expected logical sequence number, then it is to be determined whether the search on one level of the index tree is finished or not in Step 408. If the search process is not finished, the routine from the step 402 where it is determined whether the queue is empty is to be performed again. If the search process is finished, the entry of the reinsertion table is examined, and it is determined whether the entry on the current level exists in the reinsertion table in Step 409.

Based upon the result of the determination, if the entry on the current level doesn't exist in the reinsertion table, the processes are performed again from step 402 in which it is determined whether the queue is empty or not. If the entry on the current level exists, the objects in all reinsertion nodes in the reinsertion table are selected in Step 410, and the processes are performed again from the step 402 in which it is determined whether the queue is empty or not.

In the previously described search method, the write-lock obtaining operation may cause conflicts during the update operation of the node. However, this search method doesn't cause any conflicts with other search operations.

Figure 5:
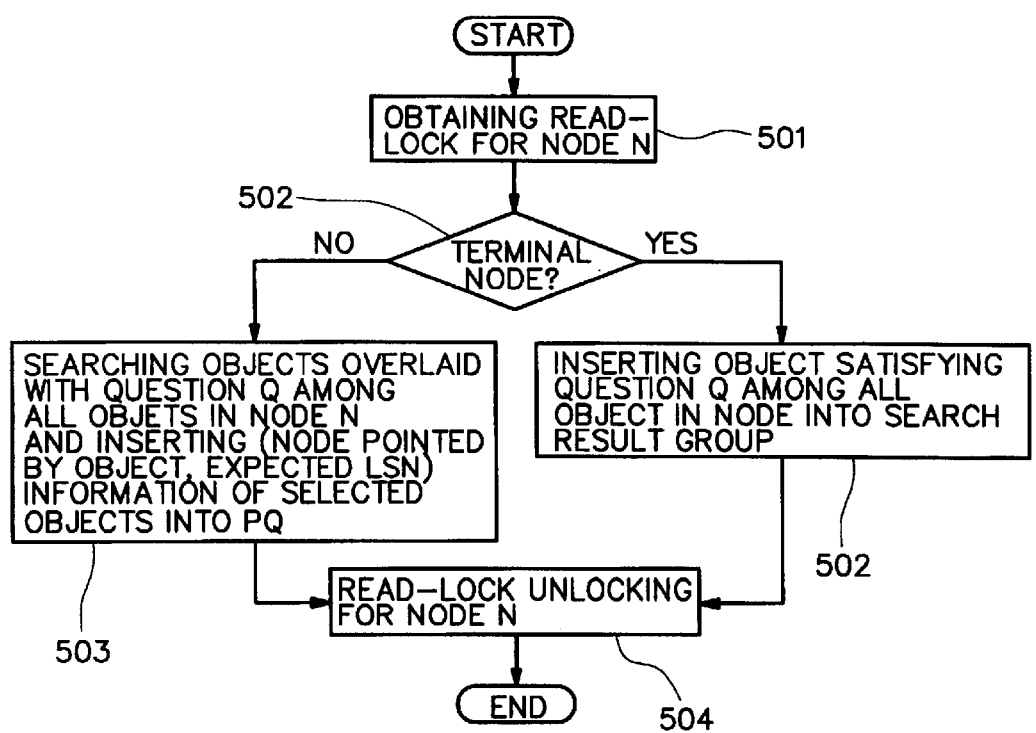
FIG. 5 is a flow chart illustrating the process to select the object, which is the expansion of the FIG. 4 according to the present invention.

FIG. 5 is a flow chart illustrating the process to select the object, which is the expansion of FIG. 4.

As shown in the Figure, the object selection process, it is determined whether the node is a terminal node in Step 501 after obtaining read-lock on node N.

Based upon the result of the determination, if the node is terminal node, the objects that satisfy query Q among all objects included in the node are inserted into the search result group in Step 503, then read-lock on node N is released and the process ends.

If the node is not terminal node, all objects included in the node are to be compared with Q. Here, each object included in the node has MBR (Minimum Bounding Region), a pointer pointing to the child node, and the expected logical sequence number of the child node. When each object is compared with query Q, MBR (Minimum Bounding Region) of the object is compared. When an overlap occurs between the object and query Q, the information regarding the child node pointed to by the object such as the pointer of the child node and expected logical sequence number of child node is inserted into the queue (InsertQ) in Step 504. Then the read-lock on node N is released and the process ends.

Figure 6:
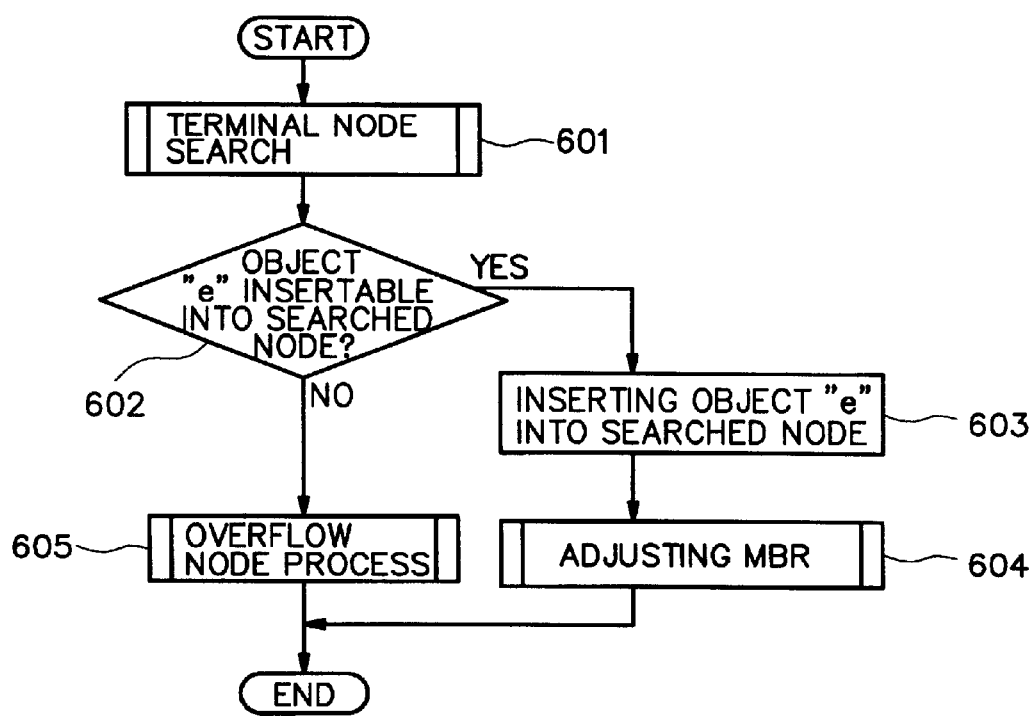
FIG. 6 is a flow chart illustrating the insertion method in which a concurrency is controlled according to the present invention.

FIG. 6 is a flow chart illustrating the insertion method in which a concurrency is controlled.

As shown in the figure, in the concurrency controlled insertion method, the most proper terminal node is searched for the object insertion in Step 601. In Step 602, it is determined whether the object "e" can be inserted into the searched node. If it can be inserted, the object "e" is to be inserted into the searched node in Step 603. The MBR (Minimum Bounding Region) is adjusted in Step 604 and then the process ends. If it cannot be inserted, node overflow is processed in Step 605 and then the process ends.

Figure 7:
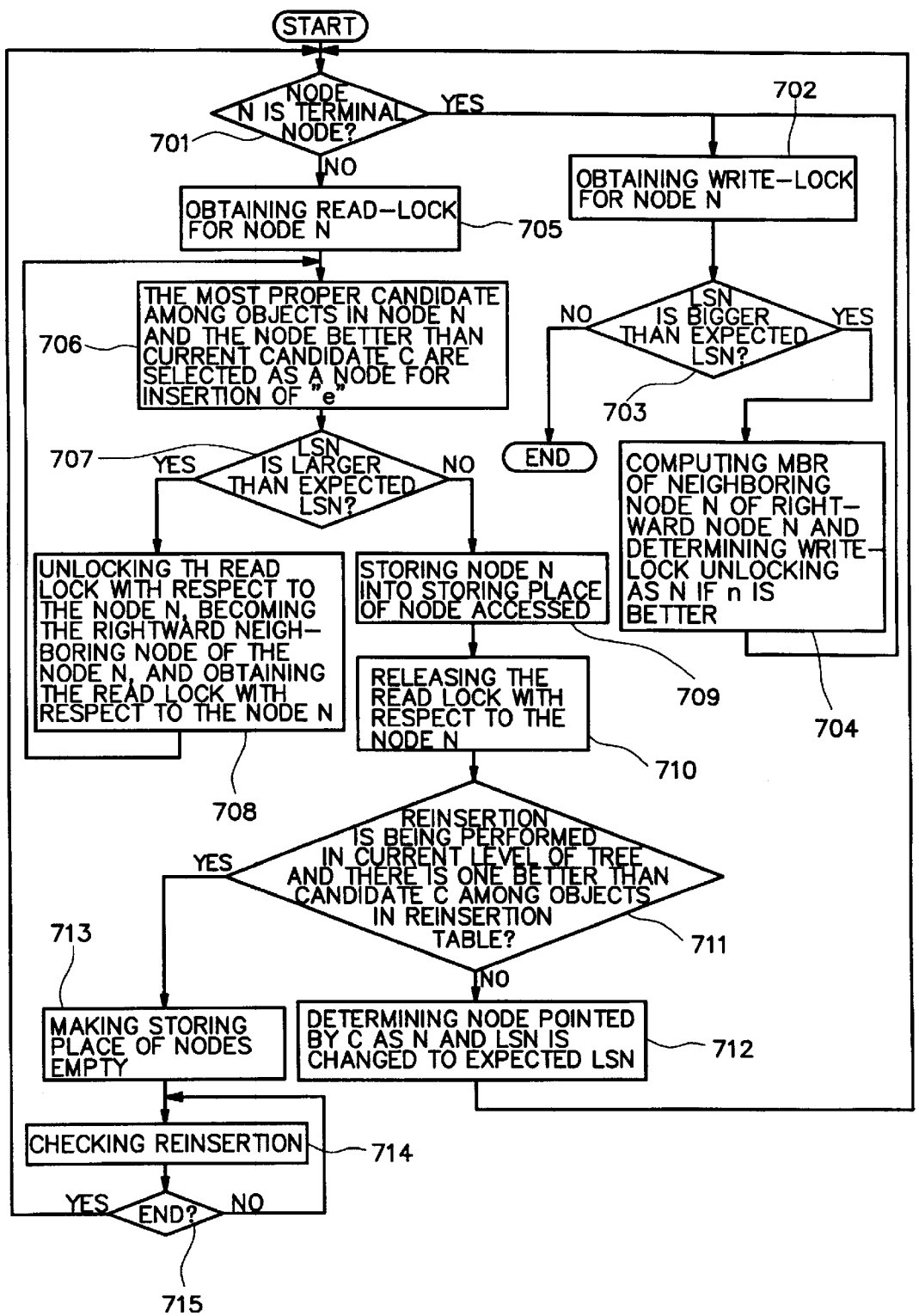
FIG. 7 is a flow chart illustrating the processes to search a terminal node, which is the expansion of FIG. 6 according to the present invention.

FIG. 7 is a flow chart illustrating the processes to search a terminal node, which is expansion of FIG. 6 according to the present invention.

As shown in the figure, in terminal node search step, the most proper child node is selected from the root node. The terminal node is selected as follows. The objects included in the selected child node are examined, then child node of the examined node is selected and the objects of the selected node are examined. This process is performed repeatedly. FIG. 7 shows a path is established from the root node to the terminal node in this repeated process. After, the object is inserted, and the information regarding the path is stored into the stack (PS: PathStack) for a reconstruction or modification of the index tree.

The step for the searching terminal node can be explained as follows. First, read-lock on the node to be examined is obtained. All objects included in the node are examined. A sub-tree including the most proper terminal node where the object "e" is to be inserted is selected. In other words, a child node of the current node is selected. It is confirmed whether the current node has been split. If the current node has been split, the previously-described procedures are performed repeatedly on other child nodes through the rightlink. During this process, the more appropriate child node can be selected rather than the currently selected child node. If a more appropriate child node is detected, the terminal node search is to be through the more appropriate child node.

Once child node is selected, information on the current node is inserted into the stack and the read-lock on the current node is released. The previously described procedures are repeatedly performed until the terminal node is searched from the selected child node. At this time, the most appropriate child node may exist in the nodes of the reinsertion table. In such cases, all content stored in the stack are to be removed, and the terminal node search is to be performed after the reinsertion of the objects of the node is finished. After all, the terminal node is to be searched by following the previously described procedures. However, since the terminal node can be split, once a terminal node is selected, it needs to be checked if neighbor nodes exist. If they exist, it needs to be checked if more appropriate node exists.

When the most appropriate terminal node is searched for inserting the object "e", write-lock is obtained on the node and it is to be checked whether the object "e" can be inserted into the node. In other words, checking whether the object "e" is inserted into the currently selected terminal node means the node is to be overflowed after the object "e" is inserted into the node. If the response reflects that the object "e" can be stored into the node, the object is stored. When a new object is inserted into a node, the MBR of the node may be modified. Therefore, after the object "e" is inserted, if the MBR of the node is modified, the modified part is to be reflected to the upper node through the MBR adjustment function. If overflow occurs on the node, this should be properly treated by the following node overflow function.

First, it is checked whether node N is terminal node or not in Step 701. If node N is terminal node, write-lock on node N is obtained in Step 702 and it is to be determined whether the logical sequence number is bigger than the expected logical sequence number in step 703.

Based upon the result of the determination, if the logical sequence number is smaller than the expected logical sequence number, the process ends. If the logical sequence number is than the expected logical sequence number, the MBR of the rightward neighbor node of node N is to be computed. If node N is more appropriate than node N, write-lock on node N is released, then node N is replaced by node n in Step 704, and the process from step 702 is performed again.

If node N is not a terminal node, the read-lock on node N is obtained in Step 705, and then the most appropriate candidate that is also more appropriate than the current candidate C among the objects included in node N is selected as the destination for object "e" in Step 706.

Later, it is determined whether LSN is bigger than the expected LSN in Step 707. If the LSN is bigger than the expected LSN, the read-lock on node N is released. The rightward neighbor node of node N replaces node N and then the read-lock on node N is obtained in Step 708. The procedures from step 706 in which the most appropriate candidate that is also more appropriate than current candidate C among the objects included in node N is selected as the destination for object "e" are performed again.

If the LSN is smaller than the expected LSN, node N is stored into the stack (the place of the node accessed is stored) in Step 709, and read-lock on node N is released in Step 710.

Later, it is to be determined whether the current level of the index tree is being reinserted and if there is a candidate more appropriate than the current candidate C among the objects in the reinsertion table in Step 719.

Based upon the result of the determination, if there is a more appropriate one, the stack is cleared in Step 713, then the reinsertion completion is monitored in Step 714, and in Step 715, it is checked whether the reinsertion is finished.

If the reinsertion is not finished, the procedures from step 714 where the reinsertion completion is to be monitored are to be performed again. If finished, the procedures from step 701 are to be performed again.

It is determined whether the current level of the index tree is being reinserted and if there is a more appropriate candidate among the objects in the reinsertion table in Step 719. Based upon the result of the determination, if there is not a more appropriate candidate, the node pointed to by the object C is replaced by node N, then the LSN is replaced by the expected LSN in Step 712, and the procedures from step 701 are performed again.

Figure 8:
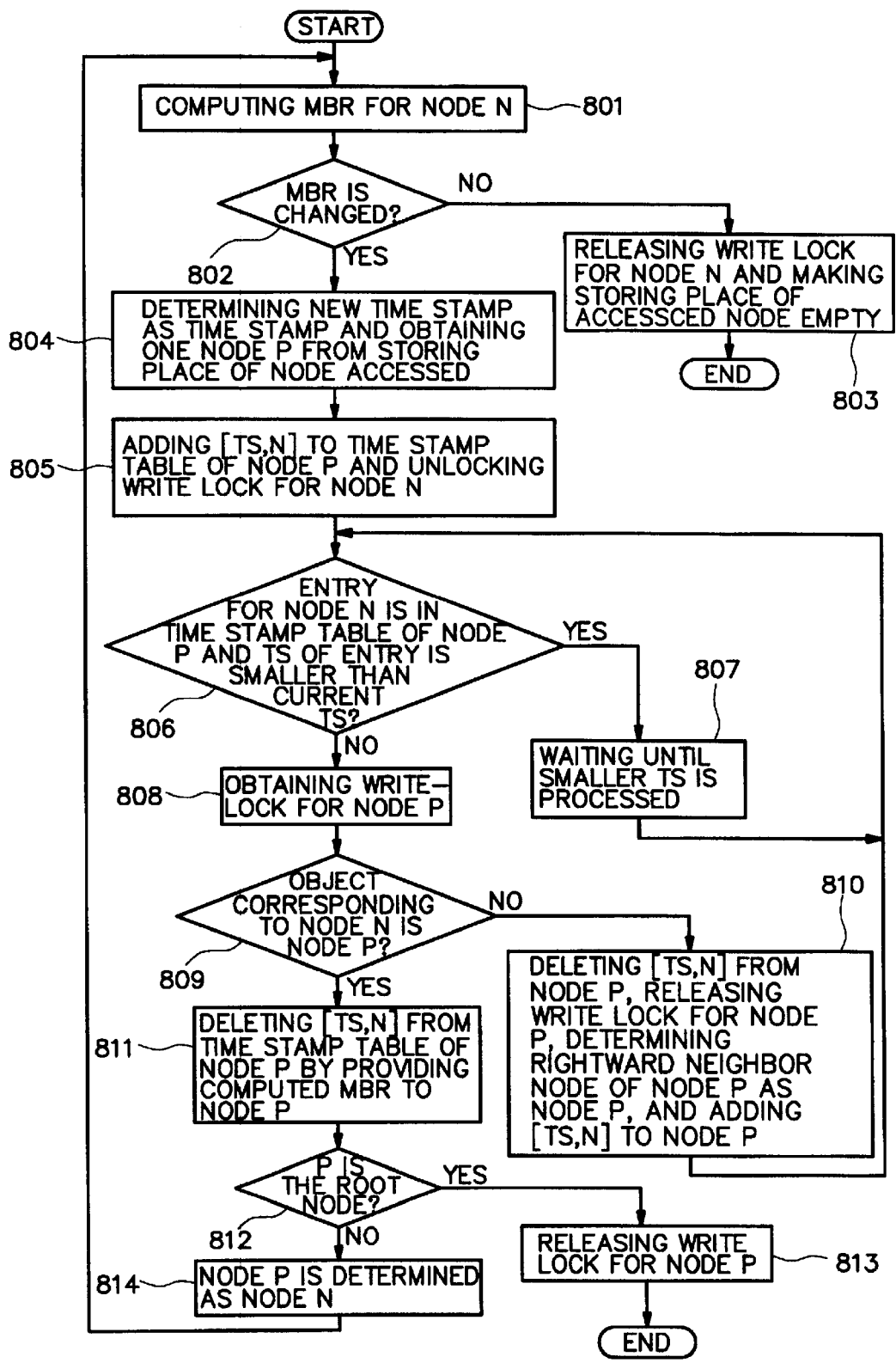
FIG. 8 is a flow chart illustrating the process to adjust MBR, which is the expansion of FIG. 6.

FIG. 8 is a flow chart illustrating the process to adjust MBR, which is the expansion of FIG. 6.

As shown in the figure, in the MBR adjustment process, the MBR of the node is computed for determining whether the MBR is changed after a new object is inserted into node N in Step 801; and then in Step 802, it is to be determined whether the MBR has been modified.

Based upon the result of the determination, if it is not changed, write-lock on node N is released and the stack is cleared in Step 803 and the process ends.

If the MBR has been modified, the modified part is reflected to the upper node by the following method.

Firstly, a new time stamp TS is allocated, and the information concerning the node P that is the upper node of node N is obtained from the stack in Step 804. (The information concerning the upper node is stored into the stack PS during the search of the terminal node).

The TS and the information concerning node N are inserted into the time stamp table of the node P as one entry, and then write-lock on node N is released in Step 805.

Later, it is determined whether there exist other entries on node N in the time stamp table of the node P and if the time stamp of the entry is smaller than TS in Step 806.

Based upon the result of the determination, if there are other entries, the modification of MBR is not to be reflected to the node P until the operations on the entries are finished in Step 807. Once the operations on the entries are finished, procedures to determine whether there is another entry on node N in the time stamp table of the node P and whether the time stamp of the entry is smaller than TS in Step 806 are to be performed again.

If there are no other entries, write-lock on the node P is obtained in Step 808, and then it is determined whether there is an object relating to node N in Step 809.

Based upon the result of the determination, if there is not any object, the information regarding TS and node N is deleted from the time stamp table of the node P, write-lock on the node P is released, and the neighbor nodes of the node P are checked. After the node P having the object relating to node N is selected, the information regarding the TS and node N is inserted into the time stamp table of the node in Step 810. Then, the procedures where it is determined whether there are other entries relating to node N in the time stamp table of the node P and the time stamp of the entry is smaller than TS in Step 806 are to be performed again.

Based upon the result of the determination, if there are other entries, the computed MBR is reflected to the node P and the [TS, N] is deleted from the time stamp table of the node P in Step 811. It is determined whether P is the root node in Step 812.

If node P is the root node, write-lock on the node P is released in Step 813 and the process ends. If node P is not the root node, node P is replaced with node N in Step 814, and then procedures from the step 801 where MBR of node N is computed are performed again.

Figure 9:
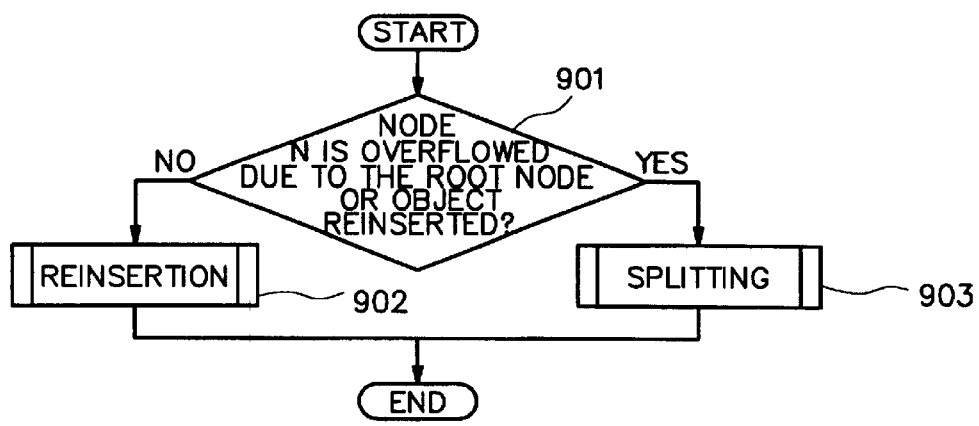
FIG. 9 is a flow chart illustrating how to handle node overflow, which is the expansion of FIG. 6.

FIG. 9 is a flow chart illustrating how to handle node overflow, which is the expansion of FIG. 6.

As shown in the figure, the node overflow process can be divided into two sub-processes. In other words, as shown in Step 901, the first process of node overflow is to determine if node N is the root node or the reinsertion object causes overflow. If the new object insertion causes overflow, the reinsertion is performed in Step 902. If node N is the root node, the separation process is performed in Step 903.

Figure 10:
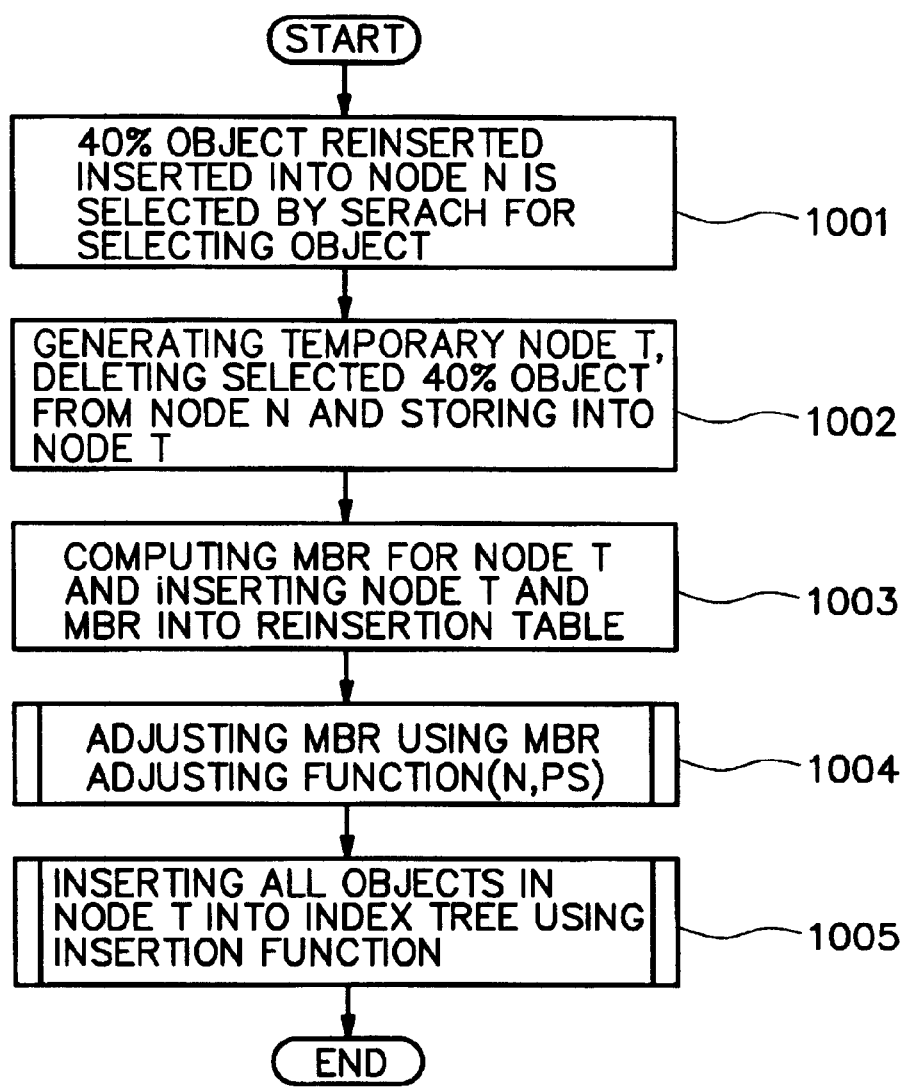
FIG. 10 is a flow chart illustrating the reinsertion process of FIG. 9.

FIG. 10 is a flow chart illustrating the reinsertion process of FIG. 9.

As shown in the figure, in the reinsertion step of FIG. 9, 40% of the objects to be reinserted into node N are selected in Step 1001 by the search process.

Next, a temporary node T is generated. The selected 40% nodes are deleted from node N and then are stored into the node T in Step 1002.

The MBR of the node T is computed and the MBR of the node T is deleted from the reinsertion table in Step 1003.

The MBR is adjusted in Step 1004. All objects in the node T are inserted into the index tree using the insertion function in Step 1005 and then the process ends.

Figure 11:
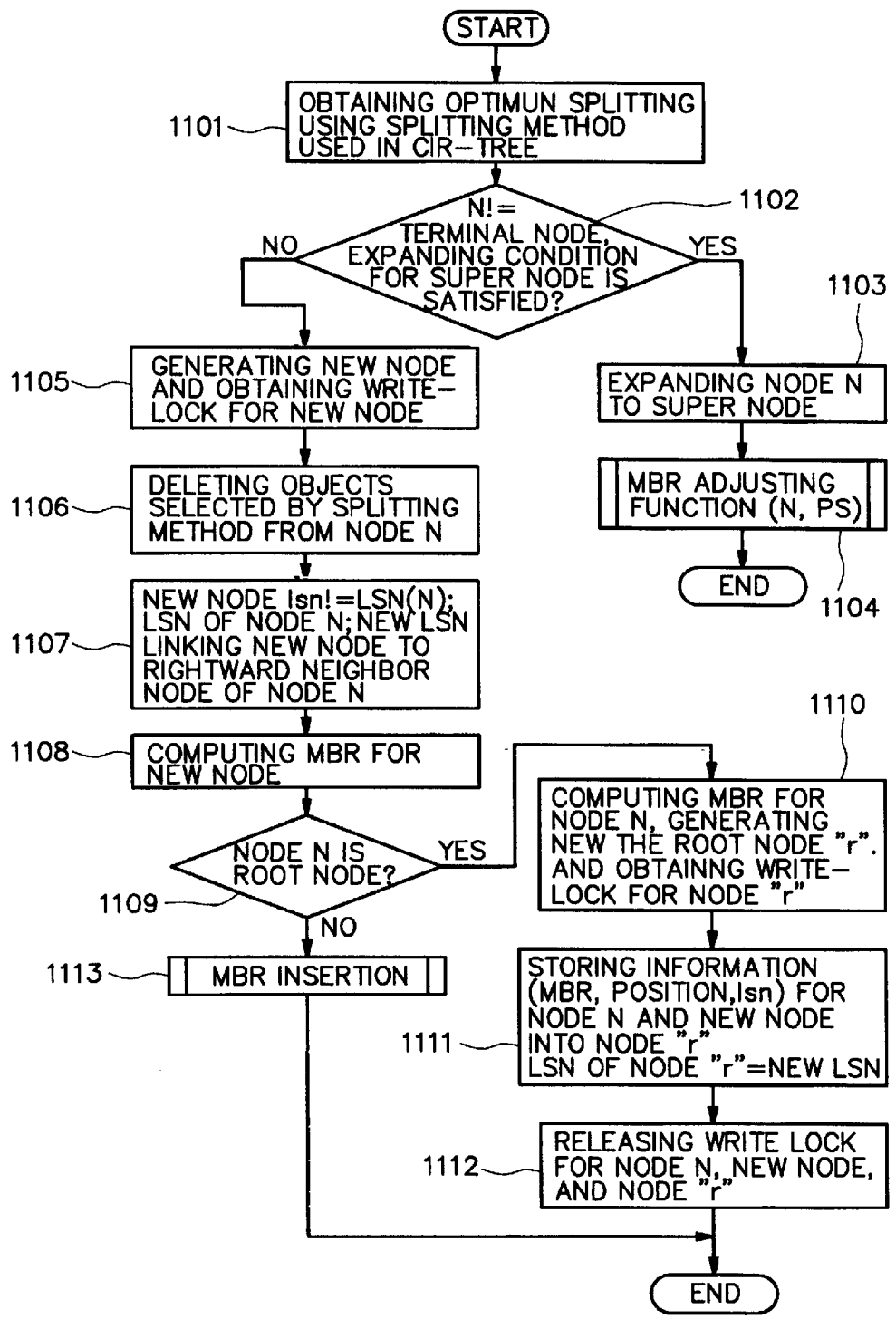
FIG. 11 is a flow chart illustrating the node separation process of FIG. 9; and, FIG. 12 is a flow chart illustrating how to insert MBR that is the expansion of FIG. 11.

FIG. 11 is a flow chart illustrating the node separation process of FIG. 9.

As shown in the Figure, first step of the node separation process of FIG. 9 is the optimum separation process by the separation method used for the CIR-tree in Step 1101.

Then it is determined whether the node is not the terminal node and if the node satisfies the expanding condition for the super node in Step 1102. If node N is not the terminal node and the condition for expanding to the super node is met, the node is not to be split and the node is expanded to the super node in Step 1103. The modified content of MBR of node N is reflected to the upper node using the MBR adjustment function in Step 1104. (The node size is constant in the index tree. However, if splitting a node generates the inefficiency index tree, the node shouldn't be split and the size of the node is expanded in order to include all objects in the expanded node. The node with the variable size capability is called a super node and the expanding condition for the super node is proposed in the CIR-tree).

If node N is a terminal node or the condition for expanding to the super node is not satisfied, a new node is generated and then write-lock on the new node is obtained in Step 1105.

Next, the objects selected by the splitting method are deleted from node N and stored into new node in Step 1106. The logical sequence number of node N is allocated to the logical sequence number of new node and a new logical sequence number is generated and allocated to node N.

The new node is connected to the rightward neighbor node of node N in Step 1107, and the MBR of new node is computed in Step 1108.

It is determined whether node N is the root node in Step 1109. If node N is the root node, the MBR of node N is computed, then a new root node "r" is generated, and write-lock on the node is obtained in Step 1110.

Next, information regarding node N and the new node is stored into the node "r". A new logical sequence number is allocated to the node "r" in Step 1111, and write-lock on new node is released in Step 1112.

If node N is not the root node, the modified content of MBR of node N is reflected to the upper node, and information regarding the new node is stored into the upper node and is reflected to the index tree in Step 1113.

Figure 12:
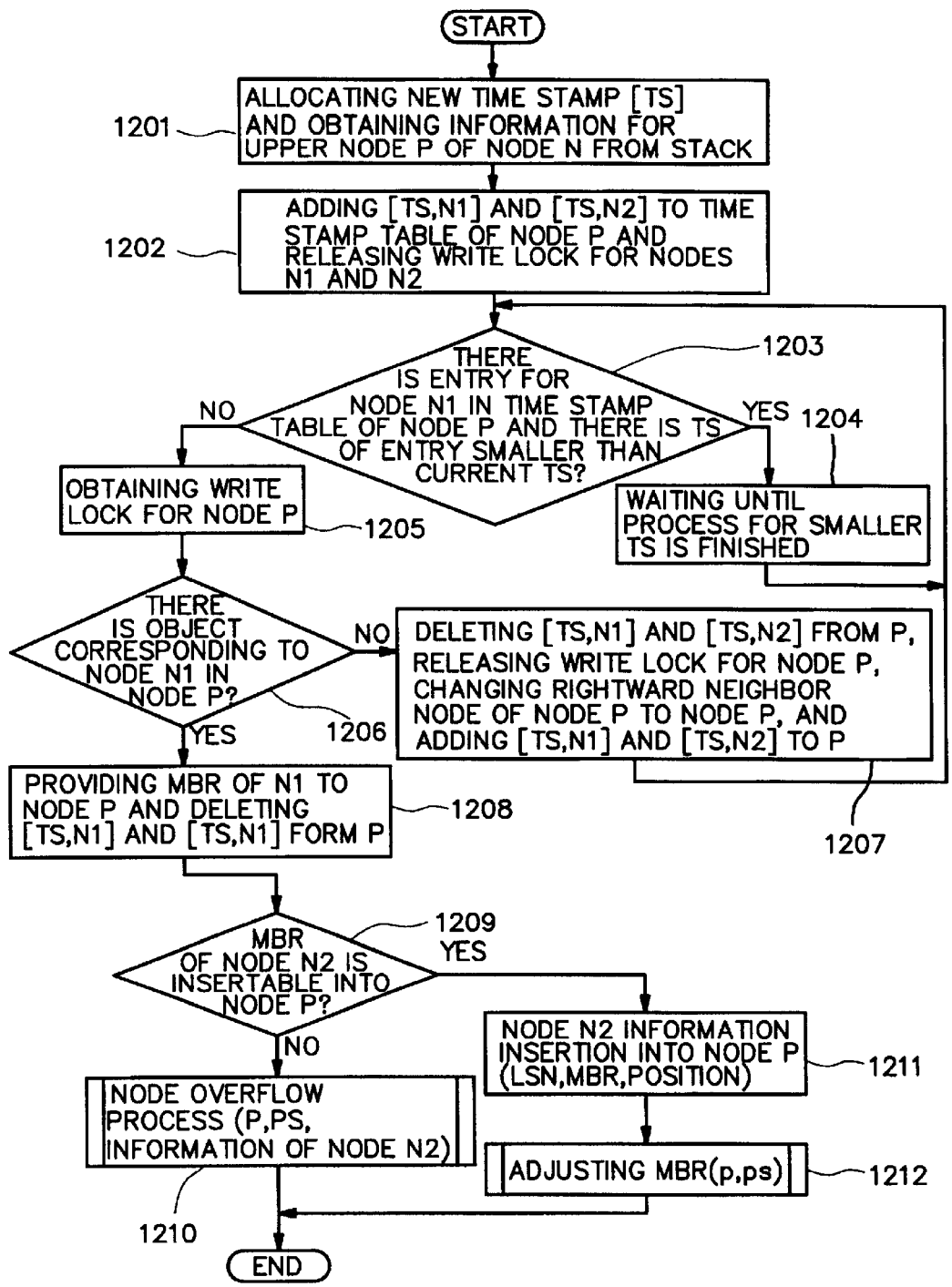

FIG. 12 is a flow chart illustrating how to insert MBR, which is the expansion of FIG. 11.

The insertion step for MBR, as shown in FIG. 11, is as follows. A new time stamp TS is allocated and an information regarding the upper node P of node N (in the figure, it is represented by N1) is obtained from the stack in Step 1201.

Information regarding the TS and node N and information regarding the TS and new node (in the figure, it is represented by N2) are inserted into the time stamp table of the node P as one entry. Then write-lock on node N and the new node is released in Step 1202.

It is determined whether other entries on node N exist in the time stamp table of the node P and if the time stamp of any entry is smaller than TS in Step 1203.

If other entries on node N exist in the time stamp table of the node P, the information regarding node N and information regarding the new node are not reflected until the processes related to the entry are completed in Step 1204. The procedures from the step 1203 where it is determined whether other entries related to node N exist in the time stamp table of the node P, and if the time stamp of the entry is smaller than TS in Step 1203 are performed again.

If other entries on node N don't exist in the time stamp table of the node P, the write-lock on the node P is obtained in Step 1205 and it is determined whether the object related to node N exists in the node P in Step 1206.

If there is not such an object, the information regarding the TS and node N and information regarding the TS and new node are deleted from the time stamp table of the node P. Then write-lock on the node P is released. The neighbor nodes of node P are to be checked and node P, including the objects relating to node N, is selected. Information regarding the TS and node N and information regarding the TS and the new node are inserted into the time stamps table of the node in Step 1207. The procedures from step 1203 where it is determined whether other entries of node N exist in the time stamp table of the node P and if the time stamp of the entry is smaller than TS are performed again.

If other entries of node N exist in the time stamp table of the node P, the modified MBR is reflected to the selected node P.

Information concerning the TS and node N and information regarding the TS and the new node are deleted from the time stamps table of the node P. (Since write-lock on node P was already obtained, even if the entries are deleted, serializability still maintains).

Next, it is determined whether information concerning the new node can be inserted by the same procedure in which a new object is inserted into the index tree in Step 1209.

If the information concerning the new node can be inserted, information concerning the new node is inserted into the node P in Step 1211, and the modified content of MBR of the node P is reflected to the upper node using MBR adjustment function in Step 1212.

If the information concerning the new node cannot be inserted, the node overflow process treats overflow on node P by the in Step 1210.

The process for deleting objects from the node is implemented by employing previously-described functions. The terminal node having an object to be deleted is searched by the terminal node search process and the object is deleted from the terminal node. The modified content of the node is reflected to the upper node. If the MBR of the node is modified, the modified content is reflected to the upper node using MBR adjustment function. If the number of objects stored in the node is smaller than the minimum required number of the nodes, all objects included in the current node are reinserted, and the current node is deleted.

In order to overcome the problems of the $R^{LINK}$-tree, the concurrency control method for a high dimensional index structure with a time stamp according to the present invention makes it possible to control the concurrency without performing a lock-coupling. In addition, it provides a method that performs a highly accurate search operation for objects deleted for reinsertion. This feature enables an insertion during node splitting operation in high dimensional index structure.

Although preferred embodiments of the present invention have been disclosed for illustrative purposes, those skilled in art will appreciate that various modifications, additions and substitutions are possible, without departing from the scope and spirit of the invention as recited in the accompanying claims.

What is claimed is:

1. In a concurrency control method for a high dimensional index structure applied to a database, an insertion method in which a concurrency is controlled, comprising the steps of:
    a first step for searching a terminal node for inserting an object and determining whether it is possible to insert an object into a searched insertion node, comprising the further steps of:
        a fourth step of determining whether the node is a terminal node;
        a fifth step of obtaining a write-lock on the node when the node is a terminal node in said fourth step and then determining whether a LSN is bigger than an expected LSN;
        a sixth step of computing MBR of a neighbor node of the searched terminal node when the LSN is bigger than the expected LSN in said fifth step and releasing write-lock on the searched terminal node;
        a seventh step of performing repeatedly from said fifth step after replacing the neighbor node as an insertion node; and
        an eighth step of searching the terminal node in the lower level nodes when the node is not the terminal node in said fourth step;
    a second step for inserting the object into the insertion node if it is possible to insert an object in said first step and adjusting a minimum bounding region (MBR); and a third step for processing node overflow of the insertion node if it is not possible to insert an object in said first step.

2. The insertion method of claim 1, wherein said eighth step for searching the terminal node comprises:

a ninth step for obtaining a read-lock on the insertion node and selecting an insertion candidate among the objects contained in the node;

a tenth step for determining whether the LSN of the selected insertion candidate is bigger than the expected LSN;

an eleventh step for releasing read-lock on the insertion node if the LSN of the selected insertion candidate is bigger than the expected LSN in said tenth step;

a twelfth step for having the rightward neighbor node as an insertion node and performing repeatedly from the step in which an insertion candidate is selected among the objects included in the node of said ninth step;

a thirteenth step for storing an information regarding the insertion node into the stack if the LSN of the selected insertion candidate is not bigger than the expected LSN in said tenth step and releasing a read-lock on the insertion node;

a fourteenth step for determining whether there is a more appropriate object than the insertion candidate among the-objects in the reinsertion table;

a fifteenth step for checking whether the reinsertion is finished after clearing a stack if there is a more appropriate object in said fourteenth step and performing repeatedly from the ninth step if the reinsertion is finished; and a sixteenth step for replacing an insertion node with the insertion candidate node if there is a more appropriate object in said fourteenth step and replacing the expected LSN with the LSN.

3. The insertion method of claim 2, wherein said second step for adjusting MBR comprises:

a seventeenth step for computing the MBR after inserting a new object into the insertion node and determining whether the MBR is modified;

an eighteenth step for releasing write-lock on the insertion node if the MBR is modified in said seventeenth step and clearing the stack;

a nineteenth step for forming a new time stamp if the MBR is not modified in said seventeenth step and obtaining the upper node from the stack;

a twentieth step for adding a new time stamp information and a node information to the time stamp table of the upper node and releasing write-lock on the insertion node;

a twenty-first step for determining whether there is an entry whose time stamp is smaller than a new time stamp as there is another entry relating to the insertion node in the time stamp table of the upper node;

a twenty-second step for waiting until the process is finished if there is an entry whose time stamp is smaller than a new time stamp in said twenty first step and performing repeatedly from said twenty first step;

a twenty-third step for obtaining write-lock on the upper node if there is not an entry whose time stamp is smaller than a new time stamp in said twenty first step and determining whether there exists an object corresponding to the insertion node in the upper node;

a twenty-fourth step for providing the computed MBR to the upper node if there exists an object corresponding to the insertion node in the upper node in said twenty third step and deleting a new time stamp and a node information from the time stamp table from the upper node;

a twenty-fifth step for releasing the write-lock on the upper node if the upper node is the root node and repeatedly performing from the seventeenth step repeatedly after replacing an insertion node with the upper node if the node is not the root node;

a twenty-sixth step for deleting a new time stamp and a node information from the upper node if there exists an object corresponding to the insertion node in the upper node in said twenty-third step and releasing the write-lock on the upper node; and a twenty-seventh step for replacing the upper node with the neighbor node of the upper node, adding a new time stamp and a node information to the upper node, and performing repeatedly from said twenty-first step.

4. The insertion method of claim 3, wherein said third step for processing node overflow comprises:

a twenty-eighth step for determining whether the insertion node is a root node, performing node splitting if the insertion node is the root node, and determining whether it is an overflow due to the object reinserted if the node is not the root node; and a twenty-ninth step for performing the node splitting if it is an overflow due to the object reinserted in said twenty-eighth step and performing a reinsertion if it is not an overflow due to the object reinserted in said twenty-eighth step.

5. The search method of claim 4, wherein said twenty-eighth step for the node splitting operation comprises:

a thirtieth step for obtaining an optimum splitting and determining whether the node satisfies an expanding condition to a super node and the node is a terminal node;

a thirty-first step for expanding the insertion node to a super node if the node satisfies the expanding condition to a super node and the node is a terminal node in said thirtieth step and adjusting the MBR;

a thirty-second step for generating new node if the node doesn't satisfy the expanding condition to a super node and the node is a terminal node in said thirtieth step and obtaining write-lock on the new node;

a thirty-third step for deleting the object selected by the splitting from the node and storing into the new node;

a thirty-fourth step for allocating a new LSN to the original node, allocating an expected LSN of the node to the new node and connecting the original node and the new node through a rightlink;

a thirty-fifth step for computing MBR of new node and determining whether the original node is the root node;

a thirty-sixth step for computing MBR of the original node if the original node is the root node in said thirty-fifth step;

a thirty-seventh step for generating a new root node and obtaining write-lock on the new root node;

a thirty-eighth step for storing information concerning the original node and the new node into the new root node, allocating the new LSN as an expected LSN of the root node and releasing write-lock; and a thirty-ninth step for inserting the MBR if the original node is the root node in the thirty-fifth step.

6. The insertion method of claim 5, wherein said twenty-ninth step for reinsertion comprises:

a fortieth step for selecting an object to be reinserted from a node in which an overflow occurs;

a forty-first step for generating a temporary node, deleting the selected object from the node in which the overflow occurs and storing the deleted object into a temporary node;

a forty-second step for computing the MBR of the temporary node and inserting the temporary node information and the computed MBR into the reinsertion table; and a forty-third step for adjusting the MBR and inserting the object of the temporary node into the index tree.

7. The insertion method of claim 6, wherein said thirty ninth step for MBR insertion comprises:

a forty-fourth step for obtaining the information regarding an upper node of the original node from the stack after getting a new time stamp;

a forty-fifth step for storing a node information and time stamp of the original node and a node information and time stamp of a new node into the time stamp table of the upper node;

a forty-sixth step for determining whether another entry of the original node exists in the time stamp table of the upper node and the time stamp of the entry is smaller than the new time stamp after releasing write-lock on the original node and new node;

a forty-seventh step for waiting until the process is finished if another entry of the original node exists in the time stamp table of the upper node in the forty-sixth step and performing repeatedly from the forty-sixth step;

a forty-eighth step for obtaining write-lock on the upper node if another entry of the original node does not exist in the time stamp table of the upper node in the forty-sixth step and determining whether there is an object corresponding to the original node in the upper node;

a forty-ninth step for deleting the original node information and a time stamp and a node information and time stamp of the new node if there is not an object corresponding to the original node in the upper node in the forty-eighth step and releasing a write-lock on the upper node;

a fiftieth step for checking the neighbor nodes of the upper node, selecting the upper node including the objects corresponding to the original node, inserting the node information and time stamp of the original node and a node information and time stamp of new node into the time stamp table of the selected node, and performing repeatedly from the forty-sixth step;

a fifty-first step for reflecting the MBR of the original node to the upper node if there is an object corresponding to the original node in the upper node in the forty-eighth step and deleting the node information and time stamp of the original node and a node information and time stamp of the new node from the upper node;

a fifty-second step for determining whether it is possible to insert the MBR of the new node into the upper node;

a fifty-third step for inserting a node information of the new node relating to the upper node if it is possible to insert the MBR of the new node into the upper node in the fifty second step and adjusting the MBR; and a fifty-fourth step for processing node overflow if it is not possible to insert the MBR of new node into the upper node in the fifty-second step.

8. In a concurrency control method for a high dimensional index structure applied to a database, a concurrency-controlled deletion method comprising the steps of:

a first step for searching a terminal node having an object to be deleted;

a second step for deleting an object from the terminal node and reflecting the modified content of the node to the upper node;

a third step for determining whether the number of objects stored in the terminal node is smaller than the minimum required number of objects after deleting an object from the terminal node of said second step; and a fourth step for deleting all objects included in the terminal node having objects to be deleted if the number of the objects stored in the node is smaller than the minimum required number in said third step, performing the reinsertion and deleting the terminal node having the objects to be deleted.

* * * * *